Nov. 21, 1967  L. H. MORIN  3,354,249
METHOD OF PRODUCING UNITED DUAL CHARACTER PARTS AND FACING PART
Filed April 17, 1964  2 Sheets-Sheet 1
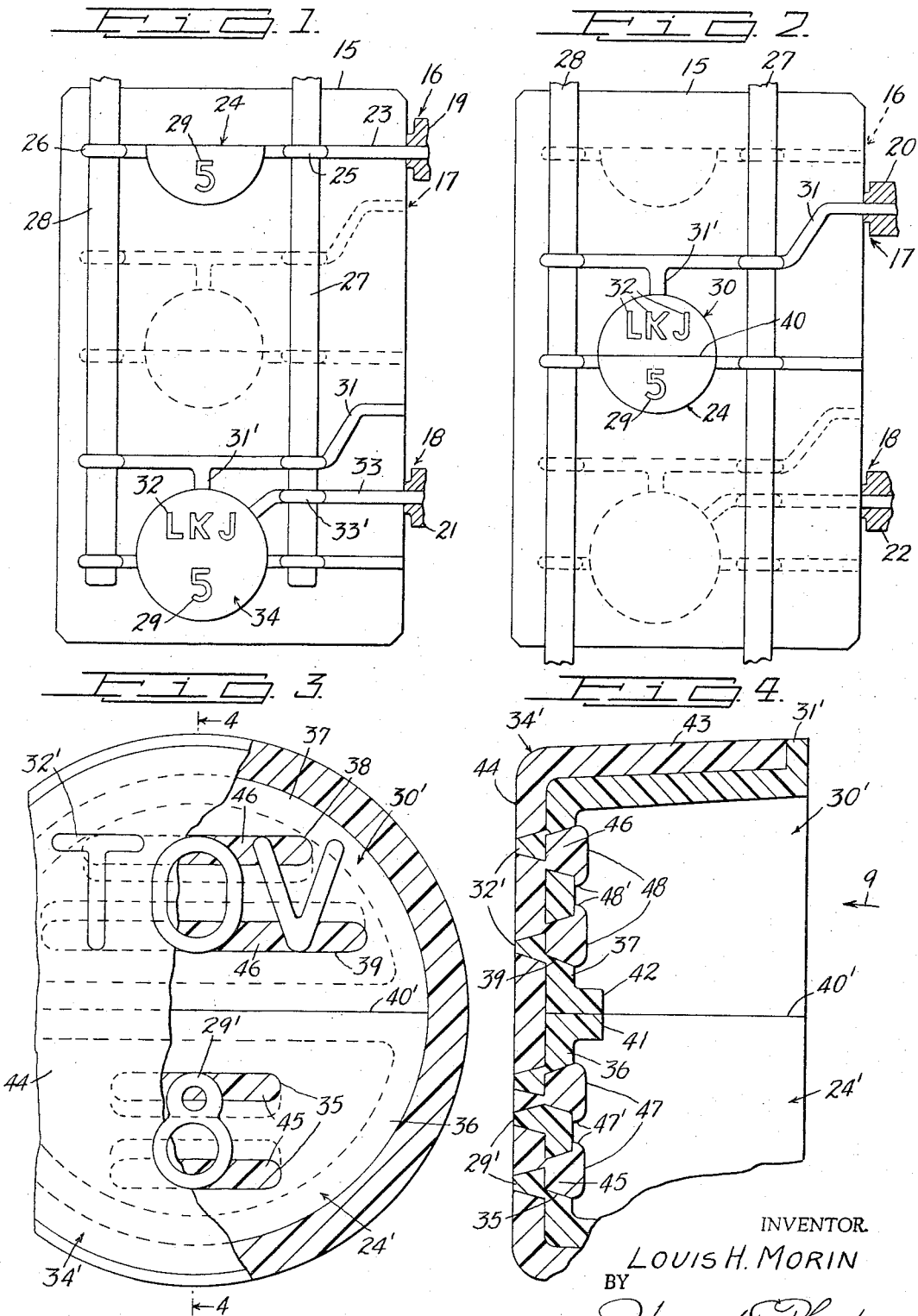
INVENTOR.
LOUIS H. MORIN
BY
Howard E. Thompson
ATTORNEY

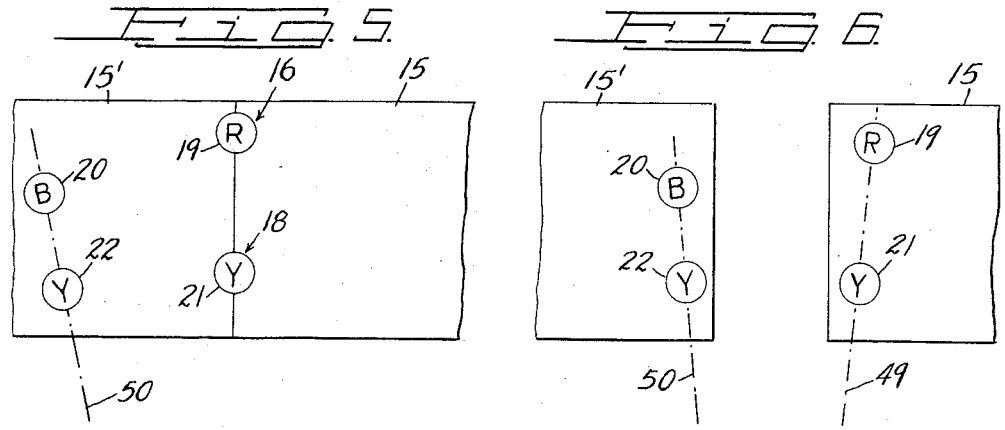
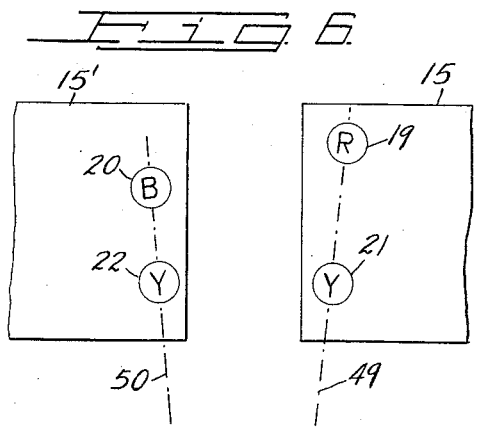
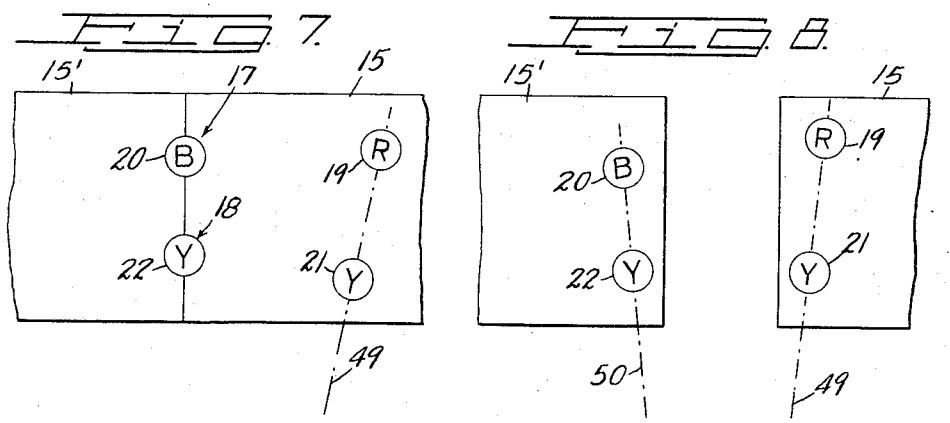
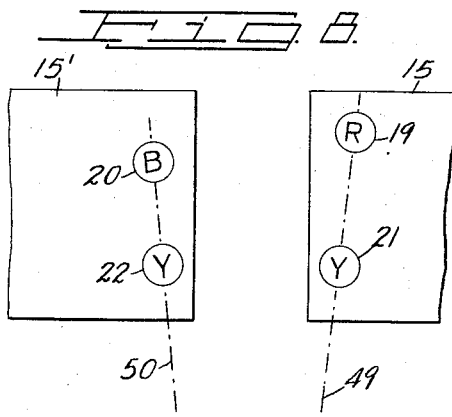
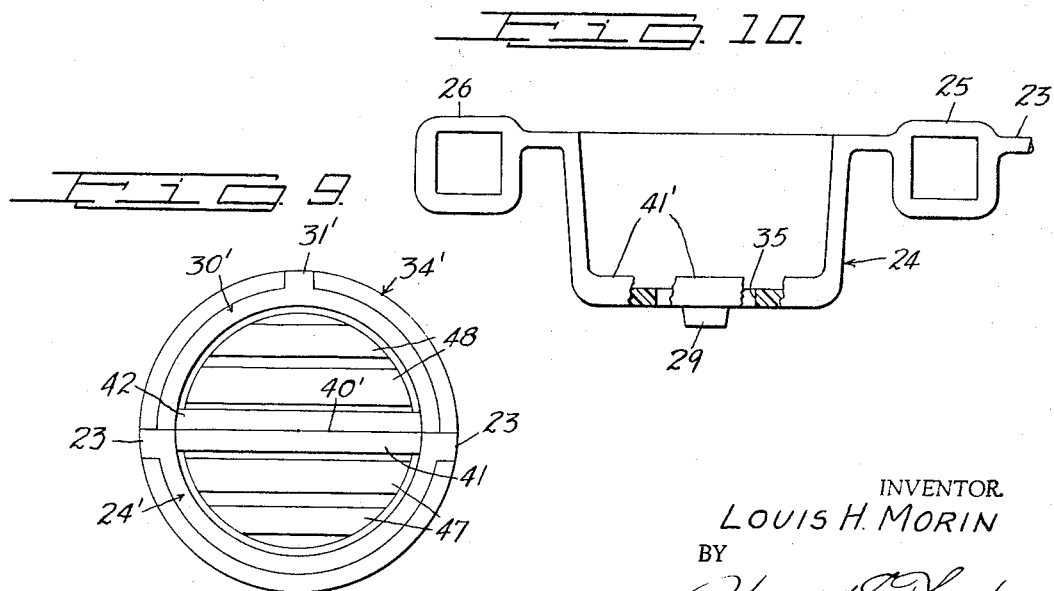
INVENTOR.
LOUIS H. MORIN
BY
ATTORNEY

United States Patent Office 3,354,249
Patented Nov. 21, 1967

3,354,249
METHOD OF PRODUCING UNITED DUAL
CHARACTER PARTS AND FACING PART
Louis H. Morin, Bronx, N.Y., assignor to Coats & Clark
Inc., New York, N.Y., a corporation of Delaware
Filed Apr. 17, 1964, Ser. No. 360,641
4 Claims. (Cl. 264—161)

This invention relates to the production of united plastic parts of multicolors in production of end products of various types and kinds. More particularly, the invention deals in a method of producing products of the kind under consideration, wherein one character part is formed at a first molding station, a second part is formed on the first character part at a second molding station and, then, the two character parts are moved to a third molding station where a facing part is mounted on both of the character parts in forming a resulting end product in three contrasting colors.

Still more particularly, the invention deals with a method of producing products of the character defined, wherein the third molding station incorporates two injection nozzles intermittently brought into injecting position in successive operations of forming the several parts at the three molding stations.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic face view of one die, illustrating the formation of parts at the first and third molding stations and indicating, in dotted lines, formation of parts at a second molding station not in operation during the formation of the two parts at the first and third stations.

FIG. 2 is a diagrammatic view, similar to FIG. 1, showing the formation at the second molding station, where a second character part is formed upon a pre-molded first character part and illustrating, in dotted lines, formations at first and second stations, as illustrated in full lines in FIG. 1.

FIG. 3 is an enlarged face and sectional view of a modified form of end product from that illustrated in FIGS. 1 and 2, with part of the construction broken away and parts shown in elevation.

FIG. 4 is a partial section on the line 4—4 of FIG. 3.

FIGS. 5 to 8, inclusive, are diagrammatic views to clearly illustrate nozzle arrangements with respect to dies when in closed and opened positions.

FIG. 9 is a view looking in the direction of the arrow 9, FIG. 4, of a finished and trimmed end product. FIG. 9 being on a reduced scale from that shown in FIG. 4; and FIG. 10 is a plan view of the first formed character part as at the first molding station, FIG. 1, with the formed part removed from the transfer cores and the dies, with part of the construction broken away and in section.

This application is a continuation-in-part of a companion application filed of equal date herewith, in which companion application die structures for producing products generally in accordance with the present method are disclosed and, for that reason, no detailed showing of the die structures will be illustrated in this application.

In illustrating one adaptation of my invention, I have shown in the accompanying drawings the production of end products, such as keys, buttons or the like, as might be used on various types and kinds of computing machines or typewriters.

Further, in the present disclosure, the end products are shown as formed of two character parts of different colors and a third facing part arranged upon both of the character parts and in a color contrasting to the colors of said character parts.

In FIGS. 1 and 2 of the drawing, I have shown, at 15, a diagrammatic face view of one die of a pair of dies. In FIGS. 5 to 8, inclusive, I have outlined, for purposes later described, the companion die 15' associated with the die 15.

In FIGS. 1 and 2, I have illustrated at 16 a first molding station, at 17 a second molding station and at 18 a third molding station. At the station 16 is an injection nozzle shown, in part, in section at 19 in FIG. 1 and this nozzle is further diagrammatically illustrated in FIGS. 5 to 8, inclusive, upon which the letter R has been applied to designate the color red, in other words, the color of the plastic material injected through said nozzle. At 20, FIG. 2, I have shown, in partial section, the injection nozzle at the second station 17 and this nozzle has also been identified in FIGS. 5 to 8, inclusive, and, in the showing in these figures, the character B has been applied to designate the color blue, the color of plastic material injected through said nozzle. In FIG. 1 of the drawing, I have shown at 21, in section, one of the nozzles employed at the third molding station and this nozzle has also been identified in FIGS. 5 to 8, inclusive, and has on it the character Y to designate the color yellow plastic material. However, at the third station, an associated nozzle 22 is employed, which in the present illustration, also has the character Y thereon. However, at this time, it is pointed out that, as and when different colors are desirable in the final facing part, the nozzles 22 may inject another color such, for example, as white, green or the like contrasting to the colors of the united character parts formed at stations 16 and 17.

Turning now to the illustration in FIGS. 1 and 2 of the drawing, it will appear that the first molding station 16 has a gate portion 23 extending to a cavity forming the first character part 24, the gating 23 also forming ring-like members 25, 26 on transfer core rods 27 and 28. A clear illustration of 25 and 26 is shown in FIG. 10 of the drawing with respect to the character part 24 which, in FIG. 1 of the drawing, is the numeral FIVE, as seen at 29.

As this same arrangement of rings 25 and 26 takes place at each of the other molding stations 17 and 18, reference at such stations will only be made to the gates to simplify the present description. Again, in the illustration in FIGS. 1 and 2, the formation of the character parts in these figures is only outlined. It will be apparent, however, that each of these character parts will be formed, as later described, in connection with the showing in FIGS. 3 and 4 of the drawing.

Turning now to the second molding station 17, where the second character part 30 is formed, 31 represents the runner leading to the cavity forming the character part 30, the runner, in this instance, including an extension 31'. In FIG. 2 of the drawing, the character part has on its face three characters 32, such as L, K and J, and the character part 30 is shown formed directly upon the character part 24 then positioned at the second molding station. At this time, it is pointed out that, while the molding stations have been identified as where the nozzles inject the plastic material, the products are actually formed where the die elements are located, which form the respective parts.

At the station 18, 33 represents the gate extending to the cavity forming the facing part 34 around both of the parts 24 and 30 then positioned at the third molding station. This will be apparent from the showing of the characters 29 and 32 on the face of the facing part 34 at the third station. The runner structure 30 differs at the third station by the fact that a single ring 33' is formed on the transfer core rod 27, rather than the dual rings, as at the first and second station.

In FIGS. 3 and 4 of the drawing, I have shown in enlarged detail and partial section a finished and trimmed end product and, in these figures, 24' represents a character part, generally similar to 24, 30' a second character part, similar to 30. The only difference between the two parts shown in FIG. 3 of the drawing is that the part 24' has the numeral EIGHT thereon, as indicated at 29', rather than the numeral FIVE and the character part 30 has the letters T O V thereon, as indicated at 32', rather than the L K J. Otherwise, these parts will be of identical construction, in other words, the character parts 24, 24' will have formed therein two elongated apertures or passages 35 disposed centrally of the outer character supporting wall 36 of the parts. The character parts 30, 30' will have on the character supporting wall 37 thereof a short elongated aperture or passage 38 and a longer aperture or passage 39, as clearly illustrated in FIG. 3. The parts 24, 24'; 30, 30' are both semi-cupshaped or thimble-shaped in form and these parts, when united at the second molding station, abut, as indicated by the line 40, FIG. 2, and 40', FIGS. 3 and 4. It will also appear, from a consideration of FIGS. 4 and 10, that the front walls of the two character parts, for example, the walls 36 of 24' and 37 of 30', have, at the abutting surfaces 40', inwardly projecting flanges 41 and 42 to provide wider surface engagements at these front walls, the flange of the part 24 being illustrated at 41' in FIG. 10.

Considering FIGS. 3 and 4 of the drawing, it will appear that the facing part 34' includes a housing portion 43 enveloping the periphery of the parts 24', 30', as clearly noted in FIG. 4. The facing part also includes a front wall 44 arranged over the surface of 36 and 37 of the parts 24', 30' and around all of the characters of the character parts 24', 32', as clearly noted in FIGS. 3 and 4. The outer wall 44 includes portions which extend through the apertures 35, as seen at 45 in FIG. 3, and through the apertures 38 and 39, as seen at 46 in said figure. The portions 45 and 46 also extend onto and overlap the inner surface of the walls 36 and 37 to form anchor bar portions or elements 47 and 48, the overlapped flange portions of said bars 47 and 48 being clearly illustrated at 47' and 48' in FIG. 4 of the drawing. This securely keys and anchors all of the parts against relative movement and separation. The bars 47 and 48 are clearly illustrated in FIG. 9 of the drawing and, in this figure, I have also illustrated the trimmed-off gate portions 23 of the character part 24, 24' and the trimmed off gate extension 31'. In this connection, it will be apparent that the gate 33 is trimmed from the surface of the facing part 34 and this would not appear on the showing in FIG. 9 of the drawing. The trimmed gate 31' is illustrated, in section, in FIG. 4 of the drawing.

The method of procedure in forming the united character and facing parts will be clearly understood from a consideration of the schematic showing in FIGS. 5 to 8 of the drawing, from which it will appear that the nozzles 19 and 21 are jointly moved along a common swivel member illustrated by the dot-dash line 49, illustrated in FIGS. 6, 7 and 8 of the drawing; whereas, nozzles 20, 22 jointly swivel along the dot-dash line 50 of FIGS. 5, 6 and 8.

It will appear that, in the first injection in the operation of the machine from the illustration in FIGS. 1 and 5, a character part 24 is formed at the first station 16 and simultaneously a blank is formed at the third station. Here, it is, of course, to be borne in mind that, in continued operation of the machine, when the facing part 34 is formed at the third station, the two character parts 24 and 30 will then be positioned at such third station in the molding of a complete product. In this first cycle of operation, it will appear that the nozzles 20, 22 are abutting the surface of the die 15' simply to keep the ends of the nozzles closed and the machine is controlled, so that no injection of material takes place when 20 and 22 are in the position shown in FIG. 5.

Now, in the transfer stage, in other words, when the character part 24 and the resulting assemblage at the third station are moved relatively to the dies, when the dies are opened as seen in FIG. 6, all of the nozzles will be sealed off on the surfaces of the dies and the character part 24 is moved to the second station, as shown in FIG. 2, and the completely formed assemblage will have been moved to a stripper and trimming station beyond the lower surfaces of the dies in accordance with known practices in the art and this is illustrated, in part, by the extended projection of the transfer cores 27 and 28 in FIG. 2 of the drawing.

The dies 15, 15' are then closed with 20 and 22 moved into the position shown in FIG. 7 and, in the next cycle of operation of the machine, plastic material will be injected at the second station to form the character part 30 on the character part 24 then positioned at the second station and a blank part which would then have been moved to a third station will have a facing part formed thereon by injection through the nozzle 22 rather than the nozzle 21, as clearly indicated by the showing in FIG. 7 of the drawing. The color can be the same as injection through the nozzle 21 in FIG. 5 or of a contrasting color, as previously stated.

In this second cycle of operation, the nozzles 19 and 21 are supported on the surface of the die 15, as shown in FIG. 7, and no injection of the material takes place through these nozzles. Immediately after the second cycle of operation, the dies are again opened, as illustrated in FIG. 8 of the drawing, all of the nozzles are sealed off on the surface of the dies 15, 15', the transfer cores 27 and 28 are again moved downwardly, having been returned to the position of FIG. 1 at the beginning of the second cycle of operation, and the assembled parts 24, 30, as formed at the second station, are transferred to position in the third station, whereupon, the dies 15, 15' are again closed, returning the parts to the position shown in FIG. 5, with the nozzles 19, 21 again in position to form the next successive character part 24 at the first station and facing part 34 at the third station. Thus, a completed three color product may be formed.

From here, the cycle of operation, above described, is repeated in producing in each cycle of operation of the machine a finished and trimmed end product, such as shown, for example, in FIGS. 3, 4 and 9 of the drawing.

Each product which comes off the third position, i.e., lowermost position in FIGS. 1 and 2, is not a perfect product (herein called a "blank") and a certain percentage has to be discarded. However, the remaining products are as described in the application and the method followed is as described. If there is no composite article made up of 24 and 30, removed from the middle cavity to the lowermost one, then the next injection will not make a complete article. It will have to be discarded. However, where there is a complete article made up of 24 and 30, moved into the third or lowermost cavities, a perfect end result is obtained. If the articles in question are made of metal or thermoplastic, the imperfect ones may be remelted so there is very little waste of the material.

In formation of the various end products, it will be understood that the die elements employed for forming the character parts can be changed from time to time in production of the desired characterizations on the resulting end products in accordance with the teachings in the companion application referred to heretofore. It will also be apparent that the shape and contour of the resulting end product can be of any particular design and cross-sectional contour, depending entirely upon the character or product produced. Here, it is to be kept in mind that the characterizations can be designs or insignia of any type and kind.

Considering FIG. 4 of the drawing, it will be seen that, in addition to the flange portions 47′, 48′, the bar portions or elements 47 and 48, where they pass through the apertures 35, 38 and 39, as at 45, 46, flare inwardly, which result is accomplished by correspondingly tapering at least the upper and lower walls of said apertures. It will also be apparent, from a consideration of FIGS. 1 and 2 of the drawing, that the formation of the end products is entirely automatic from the standpoint that the part 24 is delivered from the station 16 to the station 17 by the core rods 27, 28. Further, these rods also deliver the assembled parts 24 and 30 from the second station 17 to the third station 18 and, still further, from the third station 18 to the trimming station, which is not shown for reasons previously stated. This automatic operation not only results in the production of better end products but economizes on the production of such products.

In accordance with the method herein disclosed, a unique die structure is provided, wherein the first character part 24 is formed at the first station and the second character part 30 is formed at the second station and, at said second station, these two half parts are united to form what might be termed a cup-shaped character assemblage. Thus, when this assemblage is moved to the third station, the outer facing or casing part is formed upon the assemblage of the first and second parts. No detail showing of the cavity forming portions of the dies at the respective stations is illustrated, but this would be well understood by those skilled in the art from a consideration of the various parts produced at the respective stations and as illustrated in FIGS. 3, 4, 9 and 10 of the drawing, particularly bearing in mind the more detailed illustrations in the companion application filed of equal date herewith.

Having fully described my invention, what I claim as new and desire to secure by Letters Patent is:

1. The method of producing united plastic character and facing parts in different colors in a resulting end product, which consists in providing pairs of plastic injection nozzles simultaneously moved into injection position between a pair of dies having three molding stations, one pair of nozzles injecting plastic material simultaneously into a first and third station in forming one character part and one facing part, then, in another cycle of operation, moving the other pair of nozzles into injection position to inject material simultaneously into the second and third stations to form a second character part at said second station upon a first character part then positioned at said station, as well as to form a facing part on two character parts positioned at said third station, supporting the first pair of nozzles in inoperative position during said last named cycle of operation, then, in the next cycle of operation, again moving the first named pair of nozzles into injection position, with the second pair of nozzles supported in operative position, forming another first character part at the first station and a facing part on the two previously formed character parts then positioned at said third station, and forming the resulting end product comprising the three united parts by trimming the three united parts at a trimming station.

2. A method as defined in claim 1, wherein each of the character parts are formed with character supporting walls having passages therein opening through inner and outer surfaces of said walls, and extending the material of the facing part through said passages to dispose parts of the facing material upon inner and outer surfaces of said walls of the character parts in retaining all of said parts against relative movement.

3. A method as defined in claim 1, wherein each of the character parts include portions formed on transfer rods for movement of the first character part to the second station and the second character part to the third station and the assembled character parts from the third station to a trimming station.

4. A method as defined in claim 1, wherein employment of a nozzle in each pair registering with the third station in each cycle of operation results in production of a finished assemblage of united parts at the third station in each cycle of operation including a finished end product.

References Cited

UNITED STATES PATENTS

| | | | |
|---|---|---|---|
| 2,333,059 | 10/1943 | Tucker | 264—255 |
| 2,586,978 | 5/1952 | Murray | 264—274 |
| 2,714,949 | 8/1955 | Morin | 264—255 |
| 3,016,579 | 1/1962 | Schlitzkus | 264—247 |
| 3,031,722 | 5/1962 | Gits | 264—255 |

FOREIGN PATENTS 557,471   2/1957   Italy.

ROBERT F. WHITE, *Primary Examiner.*

EUGENE R. CAPOZIO, *Examiner.*

W. GRIEB, T. J. CARVIS, *Assistant Examiners.*